United States Patent
Wang et al.

(10) Patent No.: US 11,531,826 B2
(45) Date of Patent: Dec. 20, 2022

(54) SYSTEMS AND METHODS FOR USER CHOICE OF BARCODE SCANNING RANGE

(71) Applicant: ZEBRA TECHNOLOGIES CORPORATION, Lincolnshire, IL (US)

(72) Inventors: Dayou Wang, Mount Sinai, NY (US); Edward Chen, East Setauket, NY (US); Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/672,008

(22) Filed: Nov. 1, 2019

(65) Prior Publication Data
US 2021/0133410 A1 May 6, 2021

(51) Int. Cl.
G06K 7/10 (2006.01)
G06K 7/14 (2006.01)

(52) U.S. Cl.
CPC ..... *G06K 7/10881* (2013.01); *G06K 7/10831* (2013.01); *G06K 7/1413* (2013.01); *G06K 2007/10524* (2013.01)

(58) Field of Classification Search
CPC .................................................. G06K 7/10881
USPC ................................................... 235/462.45
See application file for complete search history.

(56) References Cited

U.S. PATENT DOCUMENTS

| 5,798,515 A | 8/1998 | Li et al. |
| 6,863,218 B2 * | 3/2005 | Muramatsu ...... G06K 19/06037 235/462.01 |
| 8,800,874 B2 | 8/2014 | Gao |
| 2002/0041712 A1 * | 4/2002 | Roustaei ............. G06K 7/1098 382/199 |
| 2004/0016814 A1 | 1/2004 | Muramatsu |
| 2006/0113390 A1 * | 6/2006 | Muramatsu .......... G06K 7/1486 235/462.27 |
| 2012/0095823 A1 * | 4/2012 | Tak ...................... G06Q 10/087 705/14.38 |

OTHER PUBLICATIONS

International Search Report and Written Opinion for International Application No. PCT/US2020/051052 dated Oct. 19, 2020.
Belgian Novelty Search Report for Belgian Application No. 2020/5784 dated Jul. 23, 2021.

* cited by examiner

*Primary Examiner* — Rafferty D Kelly
(74) *Attorney, Agent, or Firm* — Yuri Astvatsaturov (57) ABSTRACT

Systems and methods for user choice of barcode scanning ranges are provided. This is achieved through the identification of a predetermined pixel-per-module threshold range. The pixel-per-module of a barcode being read by a reader is compared to the predetermined pixel-per-module threshold range, and a successful decode of the barcode is carried out only if the pixel-per-module of the barcode falls within the predetermined range. Thus, a user may select a desired reading distance range such that barcodes within a working distance range may not generate successful decodes if such barcodes are outside of the desired reading distance range.

20 Claims, 5 Drawing Sheets

400 NEAR RANGE

410 PPM ADJUST MODE

402 MEDIUM RANGE

412 INCREASE MIN PPM

404 MAX RANGE

414 DECREASE MIN PPM

406 PROGRAM MODE

416 INCREASE MAX PPM

408 [NUMERAL 0-9]

418 DECREASE MAX PPM

NEAR RANGE

PPM ADJUST MODE

MEDIUM RANGE

INCREASE MIN PPM

MAX RANGE

DECREASE MIN PPM

PROGRAM MODE

INCREASE MAX PPM

[NUMERAL 0-9]

DECREASE MAX PPM

SYSTEMS AND METHODS FOR USER CHOICE OF BARCODE SCANNING RANGE

BACKGROUND

Devices such as barcode readers are used in a variety of applications, including in retail applications and in inventory and other industrial applications. Barcode readers have working distance ranges which may be long, in comparison to the desired scanning range for any given application. This can lead to the readers identifying barcodes that are beyond an intended identification range.

Accordingly, there is a need for barcode readers that allow for the selection of scanning ranges that are different from their maximum working range.

SUMMARY

In one embodiment, the present invention is a barcode reader comprising a housing; an imaging assembly positioned at least partially within the housing, the imaging assembly including an imaging sensor having a plurality of pixels, the imaging sensor configured to capture images of an environment appearing within a field of view (FOV) of the optical imaging assembly; and at least one processor communicatively coupled to the imaging assembly, the at least one processor being configured to decode a barcode comprising a plurality of bars, the at least one processor further being configured to: (a) determine a pixel-per-module (PPM) of the barcode based on a number of pixels that span a narrowest bar of the plurality of bars when the barcode is captured in an image by the imaging sensor; (b) analyze whether the PPM falls within a predetermined PPM threshold range; (c) responsive to the PPM falling within the predetermined PPM threshold range, generate a successful decode signal indicating a successful decode of the barcode; and (d) responsive to the PPM falling outside the predetermined PPM threshold range, abstain from generating the successful decode signal indicating the successful decode of the barcode.

In another embodiment, the present invention is a transaction processing system comprising a barcode reader having: a housing; an imaging assembly positioned at least partially within the housing, the imaging assembly including an imaging sensor having a plurality of pixels, the imaging sensor configured to capture images of an environment appearing within a field of view (FOV) of the optical imaging assembly; and at least one processor communicatively coupled to the imaging assembly, the at least one processor being configured to decode a barcode comprising a plurality of bars. The at least one processor is further being configured to: determine a pixel-per-module (PPM) of the barcode based on a number of pixels that span a narrowest bar of the plurality of bars when the barcode is captured in an image by the imaging sensor; analyze whether the PPM falls within a predetermined PPM threshold range; responsive to the PPM falling within the predetermined PPM threshold range, generate a successful decode signal indicating a successful decode of the barcode; and responsive to the PPM falling outside the predetermined PPM threshold range, abstain from generating the successful decode signal indicating the successful decode of the barcode. The system further comprises a point-of-sale system having a point-of-sale processor configured to receive said successful decode signal and process a transaction in response to the receipt of said successful decode signal.

In another embodiment, the present invention is a barcode reader comprising: a housing; an imaging assembly positioned at least partially within the housing, the imaging assembly including an imaging sensor having a plurality of pixels, the imaging sensor configured to capture images of an environment appearing within a field of view (FOV) of the optical imaging assembly; and at least one processor communicatively coupled to the imaging assembly, the at least one processor being configured to decode a barcode comprising a plurality of bars. The at least one processor is further configured to: determine a pixel-per-module (PPM) of the barcode based on a number of pixels that span a narrowest bar of the plurality of bars when the barcode is captured in an image by the imaging sensor; analyze whether the PPM falls within a predetermined PPM threshold range; responsive to the PPM falling within the predetermined PPM threshold range, generate a successful decode signal indicating a successful decode of the barcode; and, responsive to the PPM falling outside the predetermined PPM threshold range, abstain from generating the successful decode signal indicating the successful decode of the barcode. The predetermined PPM threshold range threshold range corresponds to a desired reading distance range of the barcode reader. The desired reading distance range is a subset of the working range of the barcode reader and being selected from one of: (a) a desired reading distance range that consists of all distances within the working range and closer than a desired maximum reading distance; (b) a desired reading distance range that consists of all distances within the working range and further than a desired minimum reading distance; and (c) a desired reading distance range that consists of all distances within the working distance range and both further than a desired minimum reading distance and closer than a desired maximum reading distance.

In yet another embodiment, the present invention is a method of electro-optically reading a barcode comprising a number of bars located within a range of working distances from a barcode reader, comprising: capturing light from the symbol over a field of view of an imaging sensor having a plurality of pixels; determining a pixel-per-module (PPM) of the barcode based on a number of pixels that span a narrowest bar of the plurality of bars when the barcode is captured in an image by the imaging sensor; comparing the PPM of the barcode to a predetermined PPM threshold range; and generating a successful decode signal only if said PPM of the barcode is within said predetermined PPM threshold range.

In a variation of this embodiment, the predetermined PPM threshold range threshold range corresponds to a desired reading distance range of the barcode reader, said desired reading distance range being a subset of the working range of the barcode reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
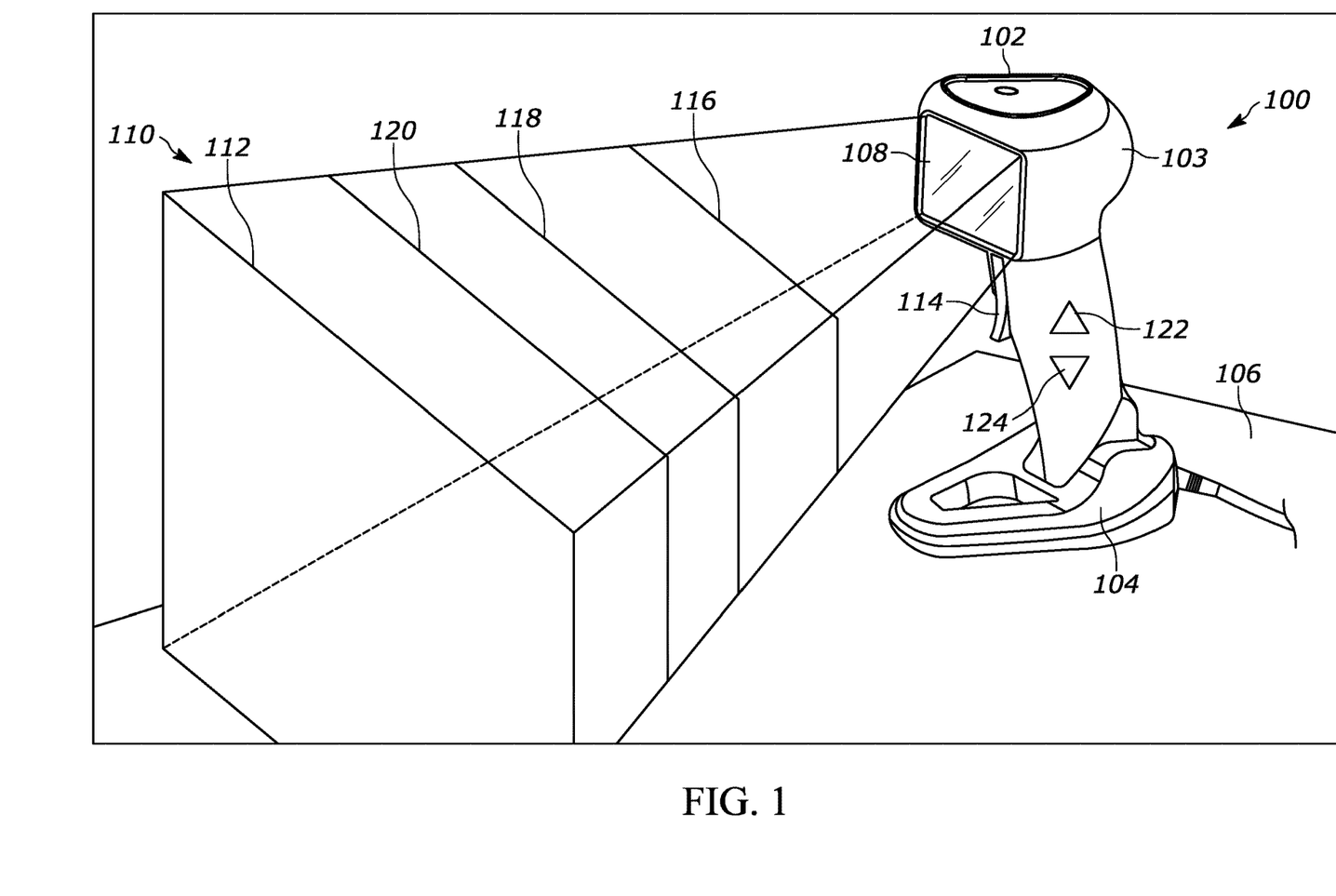
FIG. 1 illustrates a barcode reader according to one embodiment of the present invention.
Figure 2:
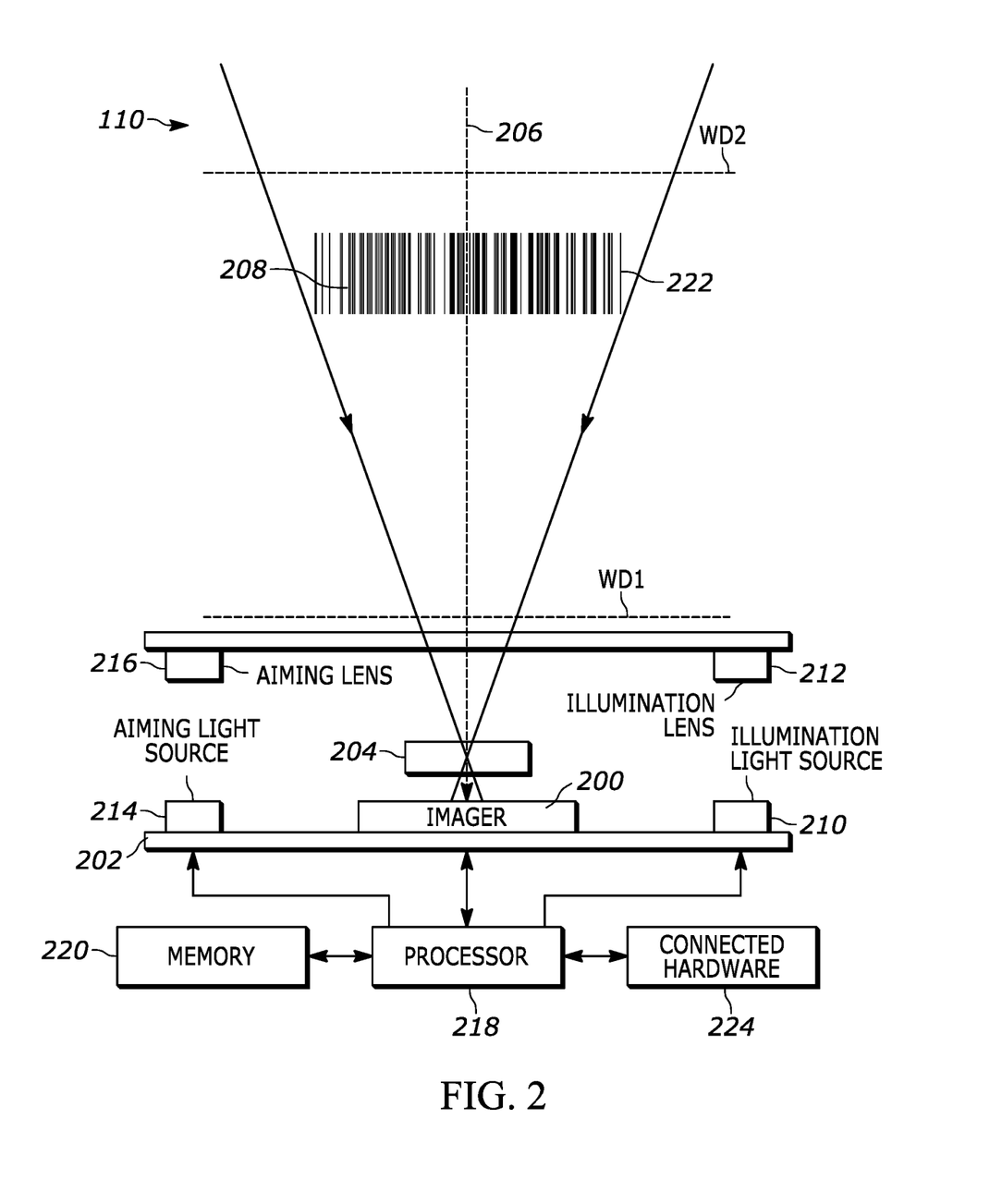
FIG. 2 illustrates a schematic of components of a barcode reader according to the present invention in the process of reading a target barcode.

FIG. 1 illustrates an exemplary scanning station 100 formed of a handheld barcode reader 102 and a stationary cradle 104 mounted to a scanning surface 106. The handheld reader 102 has a housing 103 and rests in the stationary cradle to establish a hands-free scanning mode, also termed a presentation mode, for scanning barcodes. The handheld reader 102 therefor operates as imaging reader, have a scanning window 108, behind which may be an illumination source and an imager as shown in FIG. 2. The handheld reader 102 has a field of view (FOV) 110 defined by the outwardly expanding rectangular cone or frustum shape 110. The reader 102 has a working range 112 that extends to the outermost rectangle. A trigger 114 may be used to initiate a hands-free scanning mode, or it may be used to initiate scanning when the reader 102 is being handheld. In some examples, the hands-free scanning made is initiated by placement of the reader 102 into the cradle 104.

While the FOV in FIG. 1 is illustrated using an expanding rectangle emitting from the reader 102, it is to be understood that the FOV may take on a number of different shapes depending on light sources and lensing provided within the reader 102. Further, while in FIG. 1, the working range 112 is shown by the outermost rectangle, it is to be understood that the effective working range of the reader 102 may be significantly greater than the range illustrated in FIG. 1.

Given good optical qualities for barcodes (for example, good printing contrast), substantially any barcode placed within the FOV 110, and directed toward the reader 102, will be read by the reader 102 when the reader is powered up and in condition to read codes. While this is generally beneficial, there are instances when it is desirable to have the reader 102 read only barcodes that are placed within the FOV at ranges less than the working range 112. For example, if the reader 102 is placed within an industrial environment, it may be desirable to have the reader 102 read only barcodes that are intended to be read by the reader, by placement of those barcodes close to the reader. In such an application, barcodes that are located farther than the desired distance should either not be read, or, if read, their information should not be stored by the reader 102 or conveyed by the reader 102 to other hardware.

To enable the scanning of barcodes only within a preselected range, the present invention enables the selection of threshold ranges by a user. Three thresholds are illustrated in FIG. 1: a first threshold 116, a second threshold 118, and a third threshold 120. The selection of threshold ranges may be accomplished through the use of switches 122 and 124 provided on the reader 102. These switches may be physical switches, though it is to be understood that the selection of threshold ranges may be accomplished via capacitive switches, the use of one or more dials, or by the scanning of one or more parameter barcodes that are selected by the user.

The effective selection of threshold reading ranges according to the present invention may be accomplished via the user selecting a desired pixels per module of a barcode, as will be described with reference to FIG. 2.

Referring to FIG. 2, an imaging engine, provided within a reader 102, includes a light-detecting sensor or imager 200 operatively coupled to, or mounted on, a printed circuit board (PCB) 202 in the reader 102. In an embodiment, the imager 200 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 204 over a field of view along an imaging axis 206 through the scanning window 108 in either mode of operation. The return light is scattered and/or reflected from a barcode 208 situated within the FOV 110. The imaging lens assembly 204 is operative for focusing the return light onto the array of image sensors to enable the barcode 208 to be read.

If one or more threshold scanning ranges are not chosen, the barcode 208 may be effectively read by the reader if it is located anywhere in a working range of distances between a close-in working distance (WD1) and a far-out working distance (WD2). In one embodiment, WD1 is about one-half inch from the window 108, and WD2 is about thirty inches from the window 108, though it is to be understood that readers according to the present invention may have different working distances.

An illuminating light assembly is also mounted in the reader 102. The illuminating light assembly includes an illumination light source, such as at least one light emitting diode (LED) 210 and at least one illumination lens 212, and preferably a plurality of illumination LEDs and illumination lenses, configured to generate a substantially uniform distributed illumination pattern of illumination light on and along the barcode 208 to be read by image capture. At least part of the scattered and/or reflected return light is derived from the illumination pattern of light on and along the barcode 208.

An aiming light assembly may also be mounted in the reader 102 and preferably includes an aiming light source 214, (for example, one or more aiming LEDs), and an aiming lens 216 for generating and directing a visible aiming light beam away from the reader 102 onto the barcode 208. The aiming light beam has a cross-section with a pattern, for example, a generally circular spot or cross-hairs for placement at the center of the barcode 208, or a line for placement across the barcode 208, or a set of framing lines to bound the field of view, to assist an operator in visually locating the barcode 208 within the field of view prior to image capture.

As also shown in FIG. 2, the imager 200, the illumination LED 210, and the aiming LED 214 are operatively connected to a processor 218 (such as a programmed microprocessor) operative for controlling the operation of these components. A memory 220 is connected and accessible to the processor 218. Preferably, the processor 218 is the same as the one used for processing the captured return light from the illuminated barcode 208 to obtain data related to the barcode 208. When a barcode is successfully read, the processor 218 can record a successful decode signal in the memory 220 or send the successful decode signal to connected hardware 224 such as a point of sale system (POS).

The barcode 208 will be read by the reader 102 as long as it is within the working range of the reader 102, unless one or more threshold ranges are set by a user. There are instances where a user will not want barcodes outside of a desired reading distance to be read.

The present invention enables the selection of threshold reading ranges through the use of a pixel-per-module (PPM) threshold. The PPM is a number that reflects the number of pixels of the imager 200 that are spanned by the smallest-width bar 222 of the barcode 208. The smallest-width bar of the barcode defines a module of the barcode.

A barcode 208 may be classified at the time of printing by the width of the smallest line of the barcode. For example, the narrowest element among all the bars and spaces 222 of barcode 208 might be 13 mils wide, and it may be known by a user that the user wishes for the reader 102 to read and record "13 mil" barcodes at a desired reading distance of up to 12 inches, but not to record information related to 13 mil barcodes that are placed within the working range of the reader 102 but outside of the desired reading distance.

To accomplish this, predetermined PPM threshold ranges are used. In an example, if a 13 mil barcode is placed 12 inches away from a reader, the PPM of that barcode is 3 pixels. As the barcode is moved closer to the reader, the PPM will increase (because the width of the light from the narrowest bar of the code as it impinges on the imager 200 increases as the barcode nears the reader). In other words, for a barcode of that module, it may be known that any time the PPM is 3 pixels or greater, the barcode is within the desired working distance (in this case, 12 inches away from the reader 102 or closer).

In this example, if the PPM is less than 3 pixels, it is determined that the barcode is outside the desired reading distance. Thus, the processor 218 can determine that such a barcode will not be read, or it may be read and not recorded in the memory 220. Alternatively, the barcode may be associated with information by the processor, but this information may not be passed on to any connected hardware 224 of the reader 102.

It may be desirable to effectively read only barcodes that are placed closer than a desired maximum reading distance from the reader 102. In such cases, only barcodes being equal to or greater than a predetermined PPM threshold will be read and stored. However, it may be beneficial in some cases to read and store barcode information for barcodes that are greater than a desired minimum reading distance. In these cases, only barcodes having PPMs that are equal to or less than a predetermined PPM are read (so long as they are within the working distance of the reader 102).

In other cases, it may be beneficial for systems and methods of the present invention to read and record information for barcodes that are farther than a desired minimum reading distance from the reader and also closer than a desired maximum reading distance from the reader. In these cases, only information for barcodes having PPMs that are equal to or less than a predetermined maximum PPM and equal to or greater than a predetermined minimum PPM are read and stored.

In the examples above, while the systems are described as working in an "equal to or greater than" or "equal to or less than" comparisons, it is to be understood that these systems will work in a substantially similar way if "less than" or "greater than" comparisons are used.

The non-reading of barcodes falling outside a predetermined PPM threshold may be accomplished in a number of ways. In one embodiment, the processor 218 is adapted to analyze the PPMs of detected barcodes in order to recognize when the PPM of a detected barcode is outside of the predetermined PPM threshold range. In such a case, the processor may abstain from generating a successful decode signal relevant to the detected barcode. In other cases, the processor 218 may abstain from storing information related to barcodes falling outside the predetermined PPM threshold range in the memory 220. In other embodiments, the processor 218 may abstain from forwarding information related to barcodes falling outside the predetermined PPM threshold range to connected hardware 224 such a POS system or a connected memory drive.

Figure 3:
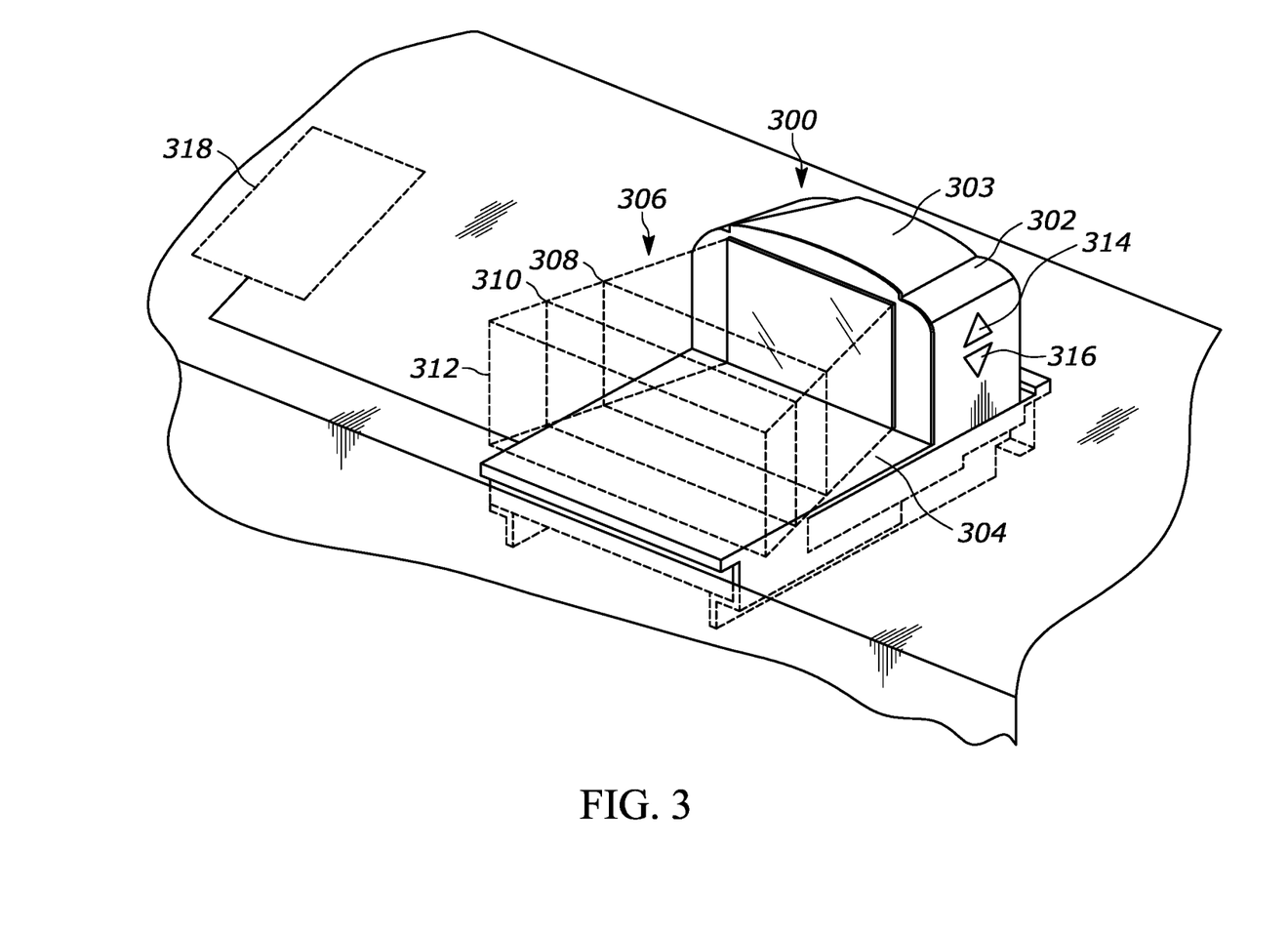
FIG. 3 illustrates a barcode reader according to another embodiment of the present invention.

FIG. 3 illustrates an alternative embodiment of the present invention in which a scanning station 300 has a bioptic barcode reader 302. Unlike the reader 102 shown in FIG. 1, the bioptic barcode reader 302 has a housing 303 and is placed in a fixed position within the scanning station 300. In this embodiment, items placed on the scanning surface 304, with barcodes within the FOV 306 of the bioptic reader 302, will be read unless the barcodes are outside a predetermined PPM threshold range. Three predetermined distance thresholds, which may be effectively set using PPM thresholds, 308, 310, and 312, are shown in FIG. 3. For example, if the furthest threshold 312 is set, and the reader 302 is set to read barcodes only closer than that threshold 312, then only barcodes closer than the threshold 312 will be effectively read.

The selection of threshold ranges may be accomplished through the use of switches 314 and 316 provided on the reader 302.

As with the reader 102, above, the reader 302 may be used at a point of sale, in which case the reader 302, and preferably a processor of the reader, is communicatively connected to a point of sale processor 318 of the point of sale system. The point of sale processor may carry out a variety of functions, such as associating prices with scanned items and generating point of sale payment requirements.

PPM threshold ranges may be set by a user in a number of ways. In one embodiment, readers 102 or 302 of the present invention are pre-set in a desired maximum reading distance mode. In such a mode, readers are controlled by the user to read only barcodes that are less than a desired maximum reading distance from the reader window. In this embodiment, the user may select the desired maximum reading distance by using an interface (such as the switches 122 and 124 in FIGS. 1 and 314 and 316 in FIG. 3) to control a minimum PPM for effective reading.

Alternatively, readers may be pre-set in a desired minimum reading distance mode. In such a mode, readers are controlled by the user to read only barcodes that are greater than a desired minimum reading distance from the reader window (but still within the working distance of the reader). In this embodiment, the user may select the desired minimum reading distance by using an interface (such as the switches 122 and 124 in FIGS. 1 and 314 and 316 in FIG. 3) to control a maximum PPM for effective barcode reading.

Figure 4:
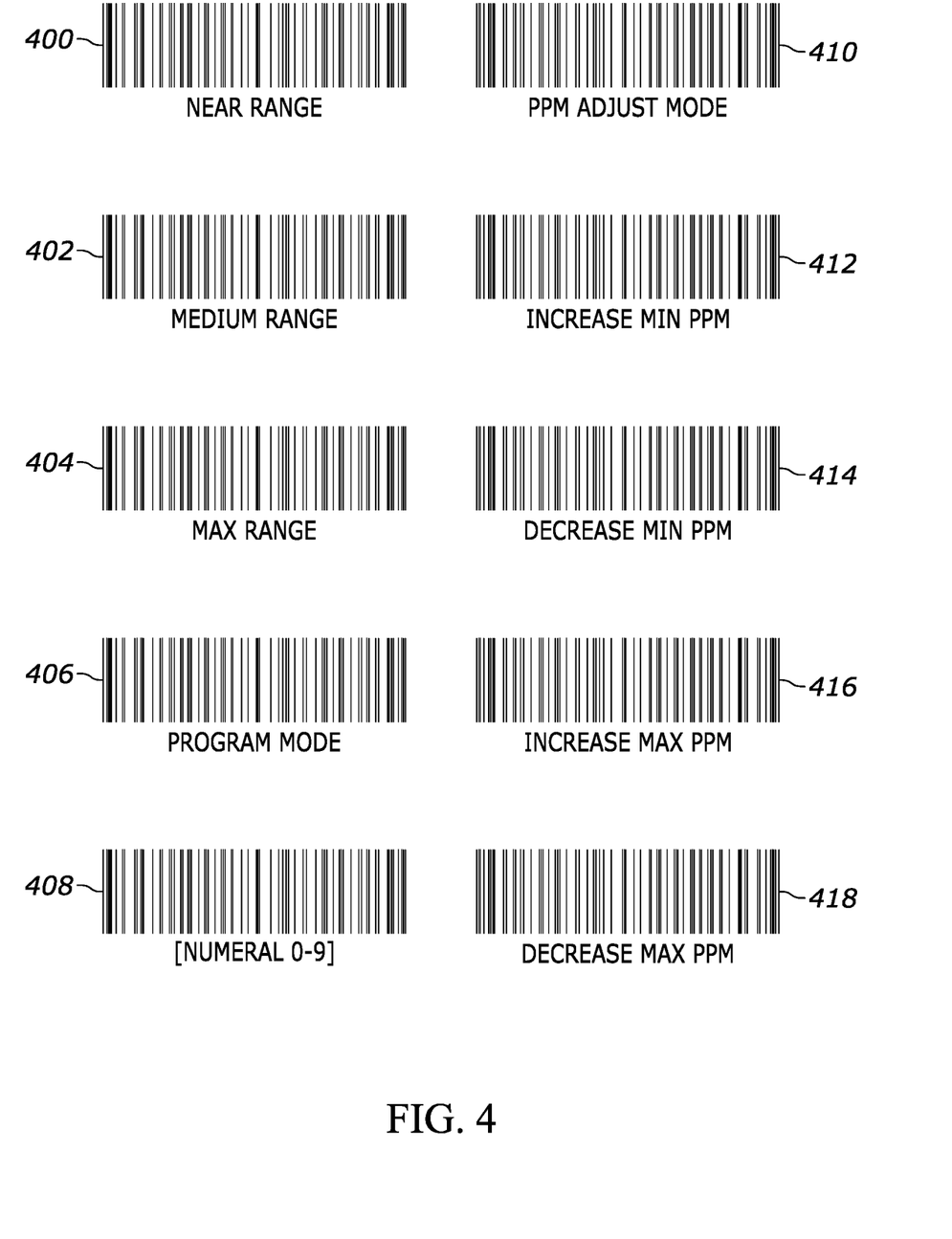
FIG. 4 illustrates examples of parameter barcodes for use in some embodiments of the present invention.

In other embodiments, predetermined PPM threshold ranges for successful barcode reads are set by the user via the scanning of one or more parameter barcodes with the barcode reader. FIG. 4 shows a number of parameter barcodes for use in such embodiments.

In one embodiment, a user may scan direct range codes 400, 402, and 404 to quickly set a desired threshold range for successful barcode reads. If a user knows that only barcodes very close to the reader should be successfully decoded, the near range barcode 400 is scanned. If the user wants a medium range for barcodes to be decoded, the medium range barcode 402 is scanned, and if the user wants a maximum distance range for successful decodes, the max range barcode 404 is scanned.

In one embodiment, the user can program a predetermined PPM threshold range directly by scanning the program mode barcode 406, which places the reader into a program mode. Then, one or more numeral barcodes (denoted by generic numeral barcode 408) are scanned in order to preset the predetermined threshold range. For example, in one embodiment if the user wants the reader to read only barcodes having a PPM of 3 or greater, the user could scan the program mode barcode 406 and then the numeral "3" among the numeral barcodes 408, in which case the reader would be set to successfully decode barcodes having PPMs of 3 or greater.

In another embodiment, a PPM adjust mode barcode 410 can be scanned, which places the reader into an adjust mode which lets the reader increase and decrease the maximum and minimum PPMs for successful decodes, thereby setting the predetermined PPM threshold range. In this embodiment, the user scans one or more of the increase min PPM barcode 412, the decrease min PPM barcode 414, the increase max PPM barcode 416, or the decrease max PPM barcode 418 to set a predetermined PPM threshold range that corresponds to a desired reading distance range.

Figure 5:
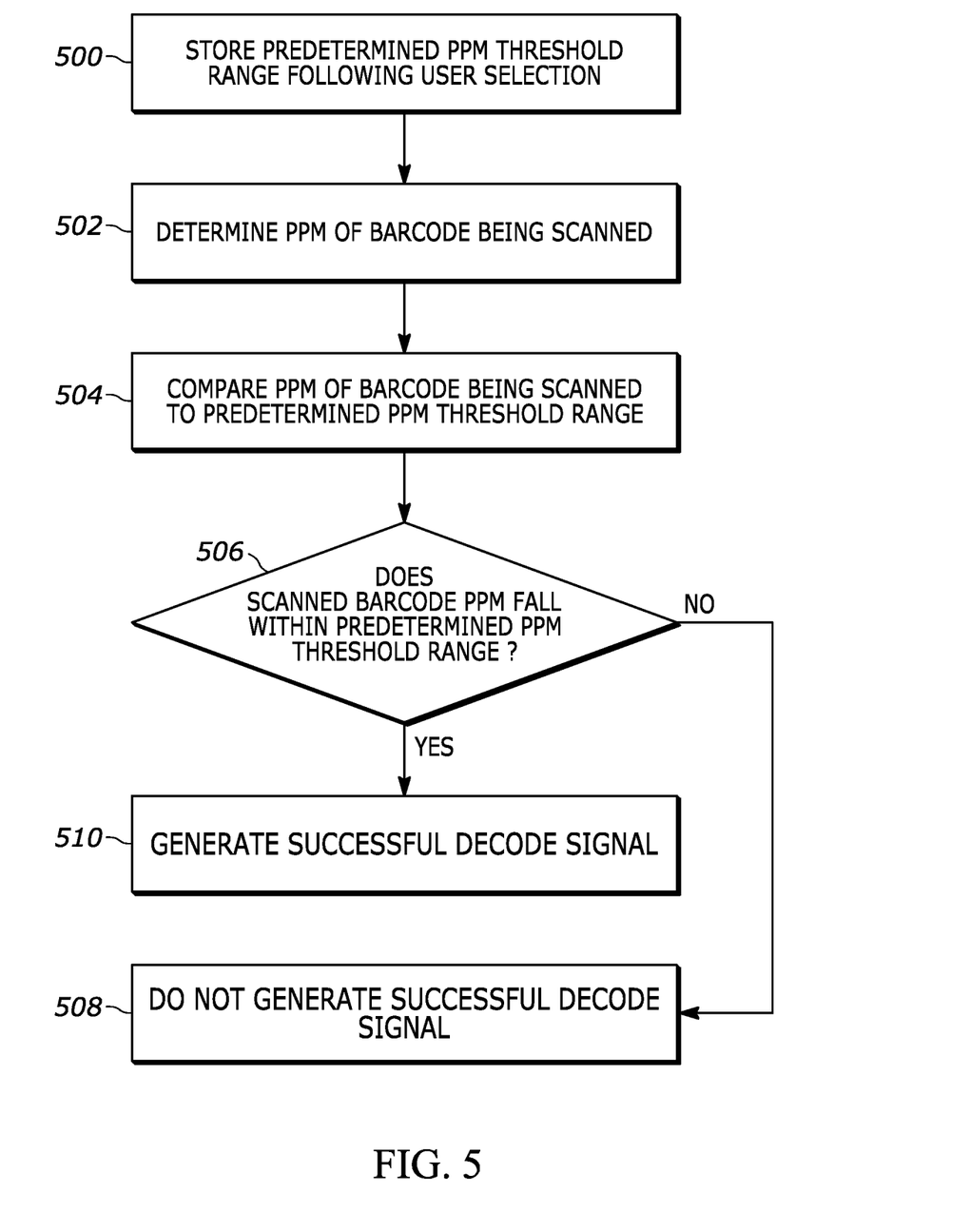
FIG. 5 illustrates a flow chart for logic used in successfully decoding only barcodes within a predetermined PPM threshold range in some embodiments of the present invention.

FIG. 5 illustrates a flow chart showing the steps involved in decoding only barcodes meeting a predetermined PPM threshold range according to some embodiments of the present invention. The steps shown in FIG. 5 may be carried out, for example, by a processor 218. As shown at block 500, a predetermined PPM threshold range is stored following user selection of this range. This may be stored in working memory of a processor or in the memory 220 of a barcode reader as shown in FIG. 2 In some embodiments, a default predetermined PPM threshold range is provided and stored without the need for user selection.

Next, as shown at block 502, the PPM of a barcode being scanned is determined. As shown at block 504, the PPM of the barcode being scanned is compared to the predetermined PPM threshold range. Then, as shown at decision block 506, it is determined whether the PPM of the barcode being scanned is within the predetermined PPM threshold range. If the PPM of the barcode being scanned is not within the predetermined PPM threshold range, no successful decode signal is generated, as shown at block 508. If the PPM of the barcode being scanned is within the predetermined PPM threshold range, a successful decode signal is generated as shown at block 510.

Systems and methods of the present invention may be used to read a variety of types of barcodes. For example, black barcodes on white backgrounds and white barcodes on black backgrounds may be read, but other color combinations (such as a green barcode on a yellow background) may also be read.

Embodiments of the present invention can be particularly advantageous because they allow for user setting of effective reading distances of a barcode reader using only the electronic hardware provided in the barcode reader. This can be advantageous as opposed to providing optical modulation alone (for example, by controlling the power of the illumination light source of the reader, or by modifying the lens assembly 204) because a wide range of desired read distances may be achieved without requiring changes to the hardware of the reader. In some embodiments of the present invention, desired minimum and maximum reading distances of between 5 centimeters and 20 centimeters are achievable solely by modifying predetermined PPM threshold ranges as described herein.

Embodiments of the present invention may be used with 2D barcodes, in which case the module is the smallest-sized image element of the 2D barcode.

Processors for use with embodiments of the present invention, such as processor 218 as shown at FIG. 2 are preferably capable of executing instructions to, for example, implement operations of the example methods described herein, as may be represented by the drawings that accompany this description. Other example logic circuits capable of, for example, implementing operations of the example methods described herein include field programmable gate arrays (FPGAs) and application specific integrated circuits (ASICs).

The example processor 218 interacts with the memory 220 to obtain, for example, machine-readable instructions stored in the memory 220 corresponding to, for example, the operations described herein and represented by the flowchart of this disclosure. Additionally or alternatively, machine-readable instructions corresponding to the example operations described herein may be stored on one or more removable media (e.g., a compact disc, a digital versatile disc, removable flash memory, etc.) that may be coupled to the processor 218 to provide access to the machine-readable instructions stored thereon.

The example processor may also include or be connected to a network interface to enable communication with other machines via, for example, one or more networks. A network interface may include any suitable type of communication interface(s) (e.g., wired and/or wireless interfaces) configured to operate in accordance with any suitable protocol(s).

Processors for use in the present invention may also include input/output (I/O) interfaces to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more processors, one or more digital signal processors (DSPs), one or more application specific integrated circuits (ASICs), one or more field programmable gate arrays (FPGAs), one or more microprocessor units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader comprising:
 a housing;
 an imaging assembly positioned at least partially within the housing, the imaging assembly including an imaging sensor having a plurality of pixels, the imaging sensor configured to capture images of an environment appearing within a field of view (FOV) of the optical imaging assembly; and at least one processor communicatively coupled to the imaging assembly, the at least one processor being configured to decode a barcode comprising a plurality of bars, the plurality of bars forming an entirety of the barcode, the at least one processor further being configured to:

determine a pixel-per-module (PPM) of the barcode based on a number of pixels that span a narrowest bar of the plurality of bars when the barcode is captured in an image by the imaging sensor;

analyze whether the PPM falls within a predetermined PPM threshold range;

responsive to the PPM falling within the predetermined PPM threshold range, generate a successful decode signal indicating a successful decode of the barcode; and responsive to the PPM falling outside the predetermined PPM threshold range, abstain from generating the successful decode signal indicating the successful decode of the barcode.

2. The barcode reader of claim 1 wherein the barcode reader is a bi-optic reader.

3. The barcode reader of claim 1 wherein the barcode reader is a handheld reader.

4. The barcode reader of claim 1 wherein the predetermined PPM threshold range is determined by a user.

5. The barcode reader of claim 1 wherein the predetermined PPM threshold range corresponds to a desired reading distance range of the barcode reader, said desired reading distance range being a subset of the working range of the barcode reader.

6. A transaction processing system comprising:
a barcode reader having:
a housing;
an imaging assembly positioned at least partially within the housing, the imaging assembly including an imaging sensor having a plurality of pixels, the imaging sensor configured to capture images of an environment appearing within a field of view (FOV) of the optical imaging assembly; and
at least one processor communicatively coupled to the imaging assembly, the at least one processor being configured to decode a barcode comprising a plurality of bars, the plurality of bars forming an entirety of the barcode, the at least one processor further being configured to:
determine a pixel-per-module (PPM) of the barcode based on a number of pixels that span a narrowest bar of the plurality of bars when the barcode is captured in an image by the imaging sensor;
analyze whether the PPM falls within a predetermined PPM threshold range; responsive to the PPM falling within the predetermined PPM threshold range, generate a successful decode signal indicating a successful decode of the barcode; and
responsive to the PPM falling outside the predetermined PPM threshold range, abstain from generating the successful decode signal indicating the successful decode of the barcode; and a point-of-sale system having a point-of-sale processor configured to receive said successful decode signal and process a transaction in response to the receipt of said successful decode signal.

7. The transaction processing system of claim 6 wherein said point-of-sale processor is further configured to associate said successful decode signal with an item and with a price for said item.

8. The transaction processing system of claim 6 wherein the predetermined PPM threshold range corresponds to a desired reading distance range of the barcode reader, said desired reading distance range being a subset of the working range of the barcode reader.

9. A barcode reader comprising:
a housing;
an imaging assembly positioned at least partially within the housing, the imaging assembly including an imaging sensor having a plurality of pixels, the imaging sensor configured to capture images of an environment appearing within a field of view (FOV) of the optical imaging assembly; and
at least one processor communicatively coupled to the imaging assembly, the at least one processor being configured to decode a barcode comprising a plurality of bars, the plurality of bars forming an entirety of the barcode, the at least one processor further being configured to:
determine a pixel-per-module (PPM) of the barcode based on a number of pixels that span a narrowest bar of the plurality of bars when the barcode is captured in an image by the imaging sensor;
analyze whether the PPM falls within a predetermined PPM threshold range;
responsive to the PPM falling within the predetermined PPM threshold range, generate a successful decode signal indicating a successful decode of the barcode; and
responsive to the PPM falling outside the predetermined PPM threshold range, abstain from generating the successful decode signal indicating the successful decode of the barcode;
wherein said predetermined PPM threshold range threshold range corresponds to a desired reading distance range of the barcode reader, said desired reading distance range being a subset of the working range of the barcode reader and being selected from one of:
a desired reading distance range that consists of all distances within the working range and closer than a desired maximum reading distance;
a desired reading distance range that consists of all distances within the working range and further than a desired minimum reading distance; and
a desired reading distance range that consists of all distances within the working distance range and both further than a desired minimum reading distance and closer than a desired maximum reading distance.

10. The barcode reader of claim 9 wherein the predetermined threshold range is selected by a user via a selector device provided on said housing.

11. The barcode reader of claim 10 wherein said selector device is a dial.

12. The barcode reader of claim 10 wherein said selector device is one or more conductive pads.

13. The barcode reader of claim 9 wherein the predetermined threshold range is selected by a user via a parameter barcode that is scanned by the barcode reader.

14. A method of electro-optically reading a barcode comprising a number of bars located within a range of working distances from a barcode reader, the number of bars forming an entirety of the barcode, comprising:
- capturing light from the symbol over a field of view of an imaging sensor having a plurality of pixels;
- determining a pixel-per-module (PPM) of the barcode based on a number of pixels that span a narrowest bar of the plurality of bars when the barcode is captured in an image by the imaging sensor;
- comparing the PPM of the barcode to a predetermined PPM threshold range; and
- generating a successful decode signal only if said PPM of the barcode is within said predetermined PPM threshold range.

15. The method of claim 14 wherein said predetermined PPM threshold range threshold range corresponds to a desired reading distance range of the barcode reader, said desired reading distance range being a subset of the working range of the barcode reader.

16. The method of claim 15 wherein said desired reading distance range is selected from one of:
- a desired reading distance range that consists of all distances within the working range and closer than a desired maximum reading distance;
- a desired reading distance range that consists of all distances within the working range and further than a desired minimum reading distance; and
- a desired reading distance range that consists of all distances within the working distance range and both further than a desired minimum reading distance and closer than a desired maximum reading distance.

17. The method of claim 14 further comprising storing said predetermined PPM threshold range in response to user selection of said predetermined PPM threshold range.

18. The method of claim 17 wherein user selection of said predetermined PPM threshold range is achieved via the reading of one or more parameter barcodes.

19. The method of claim 17 wherein user selection of said predetermined PPM threshold range is achieved via the use of switches provided a barcode reader.

20. The method of claim 14 further comprising sending said successful decode signal to external hardware connected to said barcode reader.

* * * * *